United States Patent
Fukuda (10) Patent No.: US 7,512,425 B2
(45) Date of Patent: Mar. 31, 2009

(54) PORTABLE TELEPHONE USING BONE CONDUCTION DEVICE

(75) Inventor: Mikio Fukuda, Tokyo (JP)

(73) Assignee: Temco Japan Co., Ltd., Tokyo (JP)

( * ) Notice: Subject to any disclaimer, the term of this patent is extended or adjusted under 35 U.S.C. 154(b) by 0 days.

(21) Appl. No.: 10/568,336

(22) PCT Filed: Jan. 14, 2005

(86) PCT No.: PCT/JP2005/000341

§ 371 (c)(1),
(2), (4) Date: Feb. 13, 2006

(87) PCT Pub. No.: WO2005/069586

PCT Pub. Date: Jul. 28, 2005

(65) Prior Publication Data
US 2006/0286998 A1    Dec. 21, 2006

(30) Foreign Application Priority Data
Jan. 16, 2004    (JP)    ............... 2004-009578
Mar. 31, 2004    (JP)    ............... 2004-106696

(51) Int. Cl.
*H04M 1/00* (2006.01)
(52) U.S. Cl. ............. 455/575.1; 455/575.3; 455/575.4; 455/90.3; 455/550.1
(58) Field of Classification Search .............. 455/575.3, 455/575.4, 550.1
See application file for complete search history.

(56) References Cited

U.S. PATENT DOCUMENTS

| | | | | |
|---|---|---|---|---|
| 6,134,336 A * | 10/2000 | Clark | .......... | 381/371 |
| 6,141,427 A * | 10/2000 | Fukuda | .......... | 381/151 |
| 6,483,917 B1 * | 11/2002 | Kang et al. | .......... | 379/433.02 |
| 6,668,065 B2 * | 12/2003 | Lee et al. | .......... | 381/380 |
| 6,850,138 B1 * | 2/2005 | Sakai | .......... | 335/222 |
| 6,914,996 B2 * | 7/2005 | Takeda | .......... | 381/380 |
| 7,106,878 B2 * | 9/2006 | Saiki et al. | .......... | 381/396 |
| 7,292,695 B2 * | 11/2007 | Kobayashi | .......... | 381/151 |
| 2001/0009586 A1 * | 7/2001 | Suzuki | .......... | 381/151 |
| 2002/0061115 A1 * | 5/2002 | Chung et al. | .......... | 381/398 |

(Continued)

FOREIGN PATENT DOCUMENTS

JP    56-43986    4/1981

(Continued)

*Primary Examiner*—Edward Urban
*Assistant Examiner*—April S Guzman
(74) *Attorney, Agent, or Firm*—Schmeiser, Olsen & Watts (57) ABSTRACT

A portable telephone using a bone conduction speaker, enabling production of high output without any increase in thickness of a housing of a telephone body and having no problem in use in a noisy environment. In the telephone: a bone conduction speaker (1) is used as a speaker; a concave portion (3) having a diameter larger than that of the bone conduction speaker (1) is provided in a housing (2) of a telephone body; a cushioning material (4) is installed between the inner surface of the concave portion (3) and the outer surface of the bone conduction speaker (1); the bone conduction speaker (1) is supported on the cushioning material (4) to provide a gap between the speaker and the bottom of the depression (3); and, the vibration surface of the speaker is flush with or slightly extended outward from the surface of the housing (2).

15 Claims, 5 Drawing Sheets

U.S. PATENT DOCUMENTS

| | | | |
|---|---|---|---|
| 2003/0003945 A1* | 1/2003 | Saiki et al. | 455/550 |
| 2003/0048913 A1* | 3/2003 | Lee et al. | 381/151 |
| 2003/0064688 A1* | 4/2003 | Mizuta et al. | 455/90 |
| 2003/0064758 A1* | 4/2003 | Mizuta et al. | 455/566 |
| 2003/0162560 A1* | 8/2003 | Kaneko | 455/550 |
| 2004/0198477 A1* | 10/2004 | Jung et al. | 455/575.4 |
| 2004/0259592 A1* | 12/2004 | Taneya et al. | 455/556.1 |
| 2006/0262954 A1* | 11/2006 | Lee et al. | 381/380 |
| 2007/0177742 A1* | 8/2007 | Edgren et al. | 381/89 |

FOREIGN PATENT DOCUMENTS

| | | |
|---|---|---|
| JP | 58-155186 | 10/1983 |
| JP | 1-63289 | 4/1989 |
| JP | 2003-174495 | 6/2003 |
| JP | 2003-179678 | 6/2003 |
| JP | 2003-198680 | 7/2003 |
| JP | 2004-187031 | 7/2004 |
| WO | WO 200219759 A1 * | 3/2002 |
| WO | WO 2004017532 A1 * | 2/2004 |
| WO | WO 2004032566 A1 * | 4/2004 |

* cited by examiner

PORTABLE TELEPHONE USING BONE CONDUCTION DEVICE

TECHNICAL FIELD

The present invention relates to a portable telephone using a bone conduction device, and more particularly to a portable telephone or cell phone using a bone conduction device, wherein the bone conduction device serves as a speaker and/or a microphone, is brought into contact with a user's head portion in use to catch a voice sound having been received and is capable of picking up a bone conduction sound.

BACKGROUND ART

Figure 10:
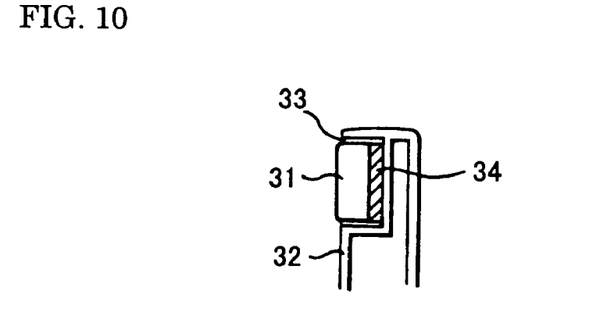
FIG. 10 is a cross-sectional view of an essential part of an example of a cell phone using a conventional type of bone conduction speaker, illustrating the cell phone in construction.
Figure 11:
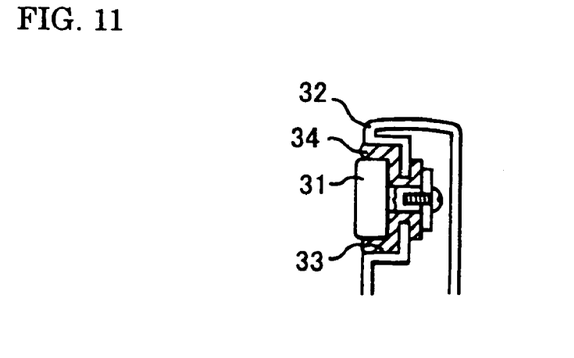
FIG. 11 is a cross-sectional view of an essential part of another example of a cell phone using a conventional type of bone conduction speaker, illustrating the cell phone in construction.

For example, in a bone conduction speaker 31 provided in a cell phone using a conventional type of bone conduction speaker, generally speaking a cushioning material 34 is interposed between the bone conduction speaker 32 and a housing 32 within a concave portion 33 of the housing 32 so as to keep the bone conduction speaker in effective isolation, wherein the concave portion 33 is provided in a suitable area of the housing 32 and has its depth extended in a direction of the thickness of the housing 32. The cushioning material 34 is provided in either a bottom surface of the concave portion 33 only (FIG. 10) or an area extending from such bottom surface to a side surface of the concave portion 33.

In the case of the cell phone using the above-mentioned conventional type of bone conduction speaker, such cell phone is convenient since the cell phone is capable of clearly catching a received sound even in a high-noise environment. On the other hand, the cell phone of this type is disadvantageous in that the cell phone of this type is larger in thickness than a cell phone using a conventional sound-pressure speaker since the cell phone of this type is provided with the concave portion for receiving therein the bone conduction speaker as described above and the cushioning material must be disposed on the bottom surface of the concave portion. The above disadvantage is remarkable in a foldable type of cell phone since an increase in thickness of the cell phone causes discomfort to its user.

In the above-mentioned construction, in order to reduce the cell phone in thickness, the cushioning material used in the cell phone is small in thickness. However, such thin-thickness cushioning material is poor in a cushioning effect. This makes it impossible to keep the bone conduction speaker in effective isolation with respect to the housing. As a result, echo back increases in volume. Due to this, in order to prevent such large echo back from being produced, it is impossible for the cell phone using the conventional bone conduction speaker to issue an output large in volume. This is a problem inherent in the cell phone using the conventional bone conduction speaker.

The same as described in the above is true also in the case of a bone conduction microphone. More specifically, the bone conduction microphone has substantially the same construction as that of the bone conduction speaker, provided that some differences are recognized between the bone conduction speaker and the bone conduction microphone in function in that the bone conduction microphone picks up a bone conduction sound through its diaphragm or vibration plate, whereas an output of the bone conduction speaker is issued from its diaphragm or vibration plate.

Patent document 1: Japanese Patent Application Laid-Open No. 2003-348208; and

Patent document 2: Japanese Patent Application No. 2002-352000

DISCLOSURE OF THE INVENTION

Problems to be Solved by the Invention

The present invention was made in order to solve the problems inherent in the portable telephone or cell phone using the above-mentioned conventional bone conduction device. Consequently, it is an object of the present invention to provide a portable telephone or cell phone using a bone conduction device capable of being used even in a high-noise environment without causing any inconvenience in use, wherein the cell phone of the present invention is free from any increase in thickness of a housing of its main body and capable of issuing an output sufficiently large in volume.

It is another object of the present invention to provide a portable telephone or cell phone using a bone conduction device, wherein a bone conduction speaker incorporated in the cell phone is used as a means for reporting a telephone call having been received.

Means for Solving the Problems

In the present invention, the above problems is solved by providing a portable telephone using a bone conduction device serving as a speaker and/or a microphone, characterized in that: a concave portion, which is larger in diameter than the bone conduction device, is formed in a housing of a main body of the telephone; a cushioning material is disposed between an inner surface of the concave portion and an outer surface of the bone conduction device; and, a gap is provided between the bone conduction device and a bottom surface of the concave portion by means of the cushioning material, through which material the bone conduction device is supported and has its vibration surface slightly extended outward from a surface of the housing.

In the present invention, the above problems is solved also by providing a portable telephone using a bone conduction device serving as a speaker and/or a microphone, characterized in that: a through-hole portion, which is larger in diameter than the bone conduction device, is formed in a housing of a main body of the telephone; a cushioning material is disposed between an inner surface of the through-hole portion and an outer surface of the bone conduction device; and, the bone conduction device has its vibration surface slightly extended outward from a surface of the housing by means of the cushioning material. In this case, the bone conduction device described in the above is capable of using both its opposite sides as diaphragms or vibration plates.

Further, in order to solve the above problem, the cell phone using the bone conduction device of the present invention may be of a foldable type provided with a housing constructed of two housing portions. In a folded condition of the cell phone, the vibration surface of the bone conduction device abuts on an inner surface of one of the housing portions, which one is oppositely disposed from the other one of the housing portions. The other one carries the bone conduction device of the housing. Alternatively, the cell phone may be of a rotatable type provided with a housing constructed of two housing portions rotatable relative to each other so as to be overlapped each other in a closed position of the cell phone. In such a closed position of the cell phone, the vibration surface of the bone conduction device abuts on an inner surface of one of the housing portions, which one is oppositely disposed from the other one of the housing portions. The other one carries the bone conduction device of the housing. Further, alternatively, the portable telephone may be of a slidable type provided with a housing constructed of two housing portions slidable relative to each other so as to be overlapped each other in a closed position of the cell phone. In such a closed position of the cell phone, the vibration surface of the bone conduction device abuts on an inner surface of one of the housing portions, which one is oppositely disposed from the other one of the housing portions. The other one carries the bone conduction device of the housing.

Further, in order to solve the above problem, in the cell phone using a bone conduction device, the bone conduction device is installed in a device installation opening of a housing for the bone conduction device by using a device holder made of a resilient material. The device holder is constructed of a container portion and a fixing portion, wherein the container portion carries the bone conduction device therein. On the other hand, the fixing portion is fixedly mounted on an inner surface of the housing of a main body of the telephone.

Preferably, an abutting plate, which is fixedly mounted on the bone conduction device to cover a front surface side of the container portion, is arranged so as to slightly extend outward from the housing. Further, a circular rib for receiving therein a peripheral edge portion of a rear surface of the abutting plate is provided in a front surface side of the container portion.

Effect of the Invention

Since the bone conduction device is supported in the concave portion of the housing of the main body of the cell phone or in the through-hole portion of the housing only through the cushioning material disposed around the bone conduction device, it is possible to keep the bone conduction device in effective isolation with respect to the housing, which makes it possible to eliminate the cushioning material having been heretofore disposed on the bottom surface of the concave portion. As a result, it becomes possible to reduce the housing in thickness, which leads to a considerable reduction in thickness of the cell phone as a whole.

When the present invention is applied to either the foldable type, the rotatable type, or the slidable type of cell phone, it is possible for the bone conduction speaker to serve as a sound pressure type speaker for outputting a telephone call sound and the like, so that a sound pressure speaker of an independent type is not required in the cell phone of the present invention.

In the present invention as set forth in claims 7 to 9: installation of the bone conduction device in the cell phone is carried out in an easy manner; and, it is possible to hold the bone conduction device in the cell phone in a stable manner. When the circular rib is provided, it is possible to prevent any dust from entering the interior of the cell phone. These are effects inherent in the cell phone of the present invention.

BEST MODE FOR CARRYING OUT THE INVENTION

A preferred mode for carrying out the present invention will be described with reference to the accompanying drawings. Incidentally, although a bone conduction speaker will be described with respect to one of working modes of a bone conduction device, such description of the bone conduction speaker is also applicable to a bone conduction microphone. In other words, both devices are substantially the same in construction, provided that a difference between these devices resides in that: one has vibrations of its diaphragm or vibration plate transmitted to a user's skull, whereas the other has vibrations of the user's skull picked up by means of its diaphragm or vibration plate.

Figure 1:
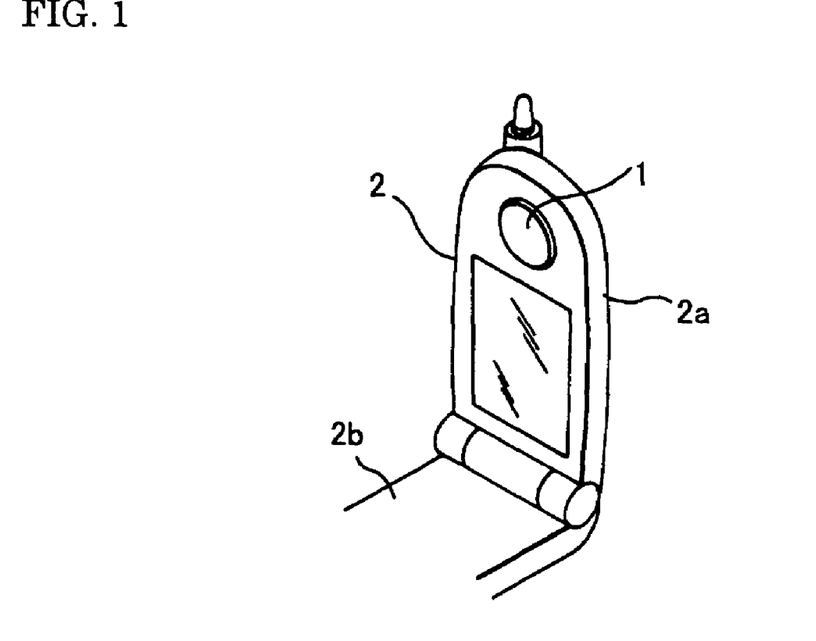
FIG. 1 is a perspective view of an essential part of a cell phone using a bone conduction device according to the present invention.
Figure 2:
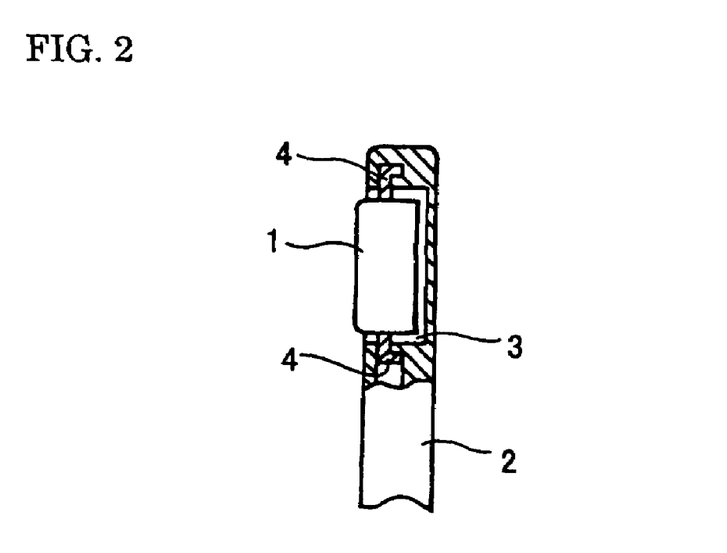
FIG. 2 is a cross-sectional view of an essential part of an embodiment of a cell phone using a bone conduction device according to the present invention.

First of all, an embodiment shown in FIGS. 1 and 2 will be described. In the embodiment shown therein, a bone conduction speaker 1 is used as a speaker. Formed in a housing 2 of a main body of a telephone is a large-diameter concave portion 3, which is larger in diameter than the bone conduction speaker 1. A cushioning material 4 is disposed between an inner surface of the concave portion 3 and an outer surface of the bone conduction speaker so as to: keep a gap between the bone conduction speaker and a bottom surface of the concave portion 3; and, support the bone conduction speaker in a condition in which a vibration surface of the telephone is flush with or slightly extended outward from a front surface of the housing. This is a physical feature of the bone conduction speaker 1 of the present invention.

In the bone conduction speaker 1 used here, preferably the diaphragm or vibration plate and the like for converting an input signal into a bone conduction voice sound vibration is incorporated in a unit casing of the bone conduction speaker 1, wherein the unit casing is limited in thickness and assumes a circular column-like shape.

The cushioning material 4 functions to keep the bone conduction speaker 1 in effective isolation with respect to the bottom surface and the inner surface of the concave portion 3, and is disposed between an outer surface of the bone conduction speaker 1 and the inner surface of the concave portion 3. The cushioning material 4 may assume a continuous shape or may be constructed a plurality of divided segments, and may be made of a suitable material such as rubber, plastics and the like.

The bone conduction speaker 1 is supported by means of the cushioning material 4 in a manner such that the bottom surface of the concave portion 3 is separated from the bone conduction speaker 4 through a gap when the bone conduction speaker 1 is vibrated. Furthermore, the vibration surface of the bone conduction speaker 1 is supported in a manner such that the vibration surface of the bone conduction speaker 1 is flush with or slightly extends outward from the front surface of the housing 3.

Incorporated in the cushioning material 4 is a speaker cable and the like for transmitting a voice sound or audio signal. This speaker cable and the like is connected, through a connector, with each of: an audio signal input terminal provided in the interior of the bone conduction speaker 1; and, an audio signal output terminal provided in the interior of the housing 2.

Figure 3:
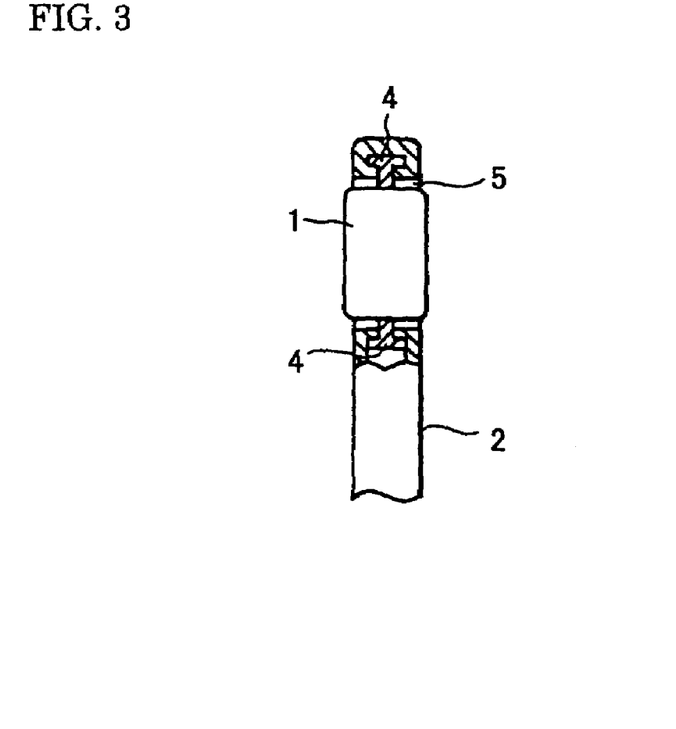
FIG. 3 is a cross-sectional view of an essential part of another embodiment of a cell phone using a bone conduction device according to the present invention.

In an embodiment shown in FIG. 3, the concave portion 3 described in the above is constructed of a laterally extended through-hole portion 5 extending laterally in the housing 2. The embodiment has substantially the same construction as that of the other embodiment with the exception of the through-hole portion 5. Incidentally, in the case of this embodiment, as shown in FIG. 3, it is possible to use each of a front surface and a rear surface of the housing 2, provided that both the opposite surfaces of the bone conduction speaker 1 are flush with or slightly extend outward from the outer surface of the housing 2.

Figure 4:
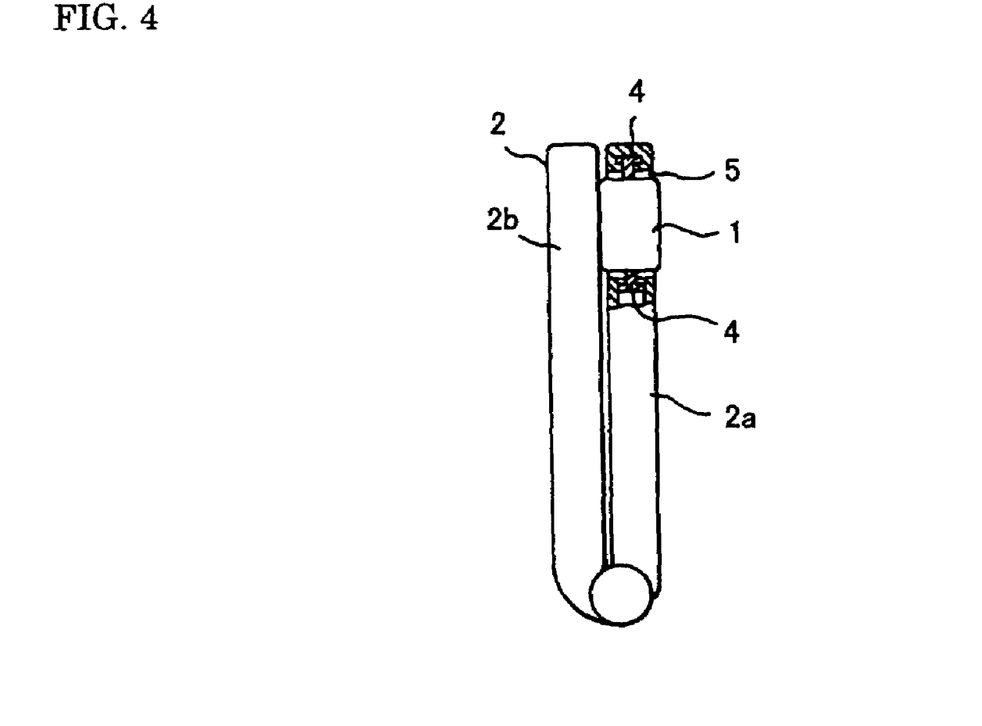
FIG. 4 is a cross-sectional view of an essential part of further another embodiment of a cell phone using a bone conduction device according to the present invention.
Figure 5:
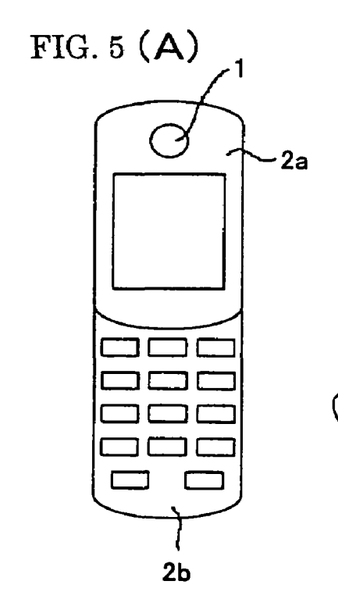
FIG. 5 are views of still further another embodiment of a cell phone using a bone conduction device according to the present invention, illustrating the cell phone in construction.
Figure 6:
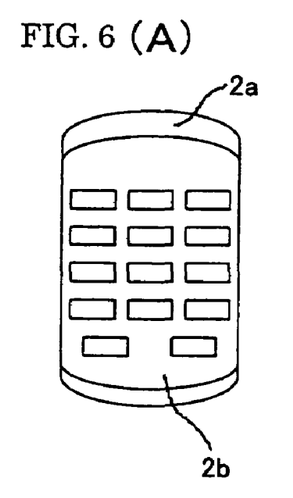
FIG. 6 are views of still further another embodiment of a cell phone using a bone conduction device according to the present invention, illustrating the cell phone in construction.

In the case of a foldable portable telephone or cell phone having its housing 2 constructed or a pair of housing portions, it is possible to: fold the housing 2 (see FIGS. 1 and 4); rotate the housing 2 (see FIG. 5); and, slide the housing 2 (see FIG. 6). Due to this, in the case of the cell phone having its housing portions overlapped each other by sliding these housing portions (see FIG. 6), it is possible to use the bone conduction speaker 1 during standby in order to catch a telephone call through a call sound without separately providing a sound pressure type speaker.

In other words, the housing 2 of such type of cell phone is constructed of a pair of the housing portions 2a, 2b, which are disposed adjacent to each other and capable of overlapping each other. Incorporated in one 2a of these housing portions 2a, 2b is the bone conduction speaker 1. Due to this, it is possible to have the vibration surface of the bone conduction speaker 1 disposed adjacent to an inner surface of the other one 2b of the housing portions 2a, 2b during standby, in the other one 2b of which housing portions 2a, 2b any bone conduction speaker 1 is not provided. As a result, it is possible for the cell phone to issue an air vibration sound to the outside when a telephone call is received to vibrate the bone conduction speaker 1, wherein the vibrations are transmitted from the housing portion 2b to the entire housing 2 to vibrate the housing 2 to make it possible to issue such an air vibration sound to the outside.

In the above construction, in the cell phone having its housing portions rotated relative to each other as shown in FIG. 5, the embodiment of the bone conduction speaker 1 shown in FIG. 3 is used, in which cell phone both the opposite surfaces of the bone conduction speaker 1 serve as vibration surfaces. In the case of the sliding type of cell phone shown in FIG. 6, both the embodiments shown in FIGS. 2 and 3 are capable of being used.

Incidentally, in general, an operating button is disposed in an abutting area of the housing portion 2b on which area the vibration surface of the bone conduction speaker 1 abuts. Due to this, it is preferable to arrange the vibration surface so as to be brought into direct contact with the surface of the housing in order to avoid any contact with the operating button. In this case, it is possible to increase an output sound in volume by changing the vibration surface of the bone conduction speaker 1 in material in a position in which the vibration surface abuts on the housing.

In the above construction, upon receipt of the telephone call, a sound of the call is issued as a bone conduction sound from the vibration surface of the bone conduction speaker 1 and transmitted to the housing 2 of the main body of the telephone. At this time, the housing 2 itself serves as a diaphragm or vibration plate. As a result, the sound of the call is issued as an air vibration intensified in volume. The call is thus reported through both the vibration effect of the bone conduction speaker 1 and the air vibration effect caused by the vibration of the housing 2 itself.

When the housing 2 is opened so that the vibration surface of the bone conduction speaker is separated from the housing portion 2b, the bone conduction speaker 1 performs its inherent bone conduction sound transmitting function. In other words, during communication, a received sound is issued as a bone conduction vibration from the vibration surface of the bone conduction speaker 1, which makes it possible for the user to catch the received sound by having the vibration surface brought into contact with his or her head portion. At this time, there is substantially no fear that the received sound leaks out. Consequently, it is possible to use the cell phone of the present invention in communication as is in the conventional cell phone.

Figure 7:
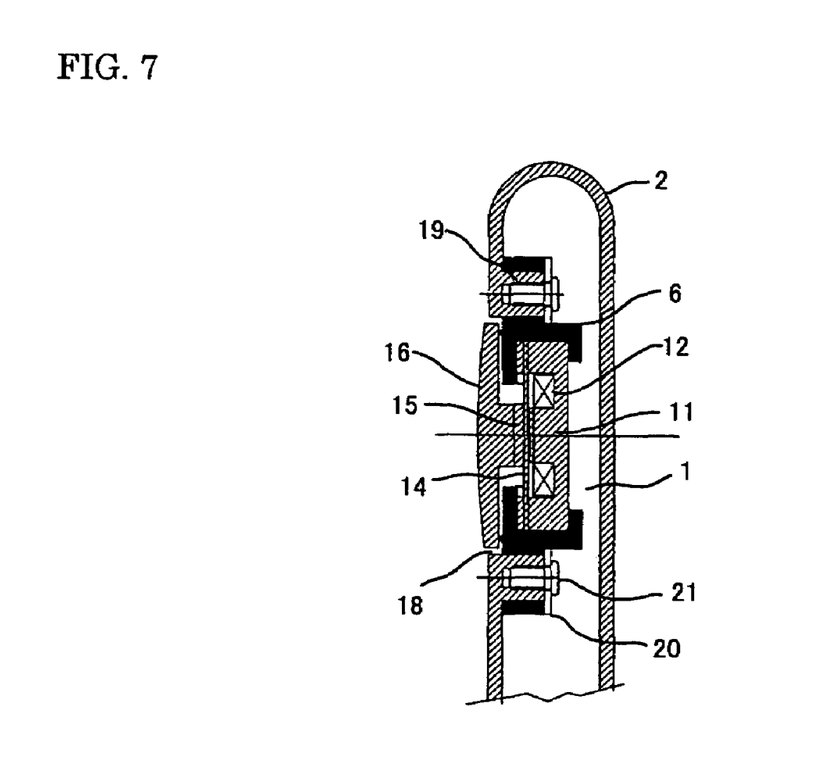
FIG. 7 is a view of still further another embodiment of a cell phone using a bone conduction device according to the present invention, illustrating the cell phone in construction.
Figure 8A:
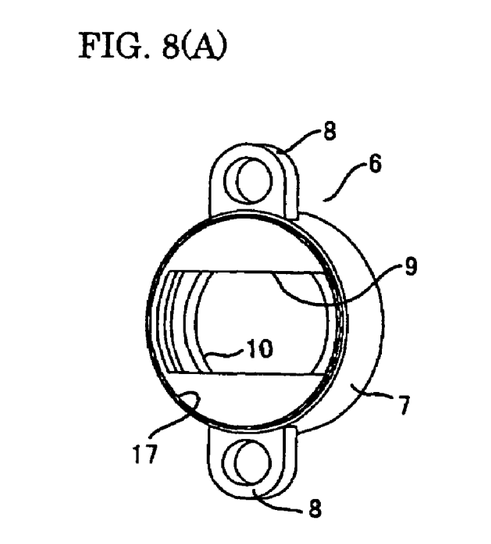
FIG. 8 are views comprising a perspective view and a longitudinal sectional view a device holder used in the embodiment shown in FIG. 7, illustrating the device holder in shape.
Figure 8B:
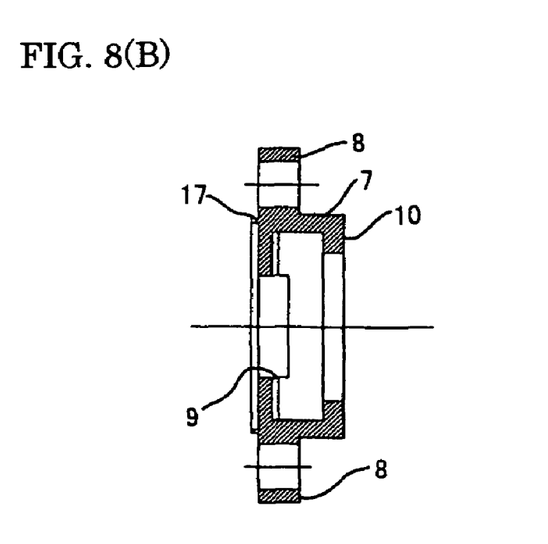

In the embodiment shown in FIGS. 7 and 8, the bone conduction device is supported in a device holder 6, which is made of a resilient material such as plastics, rubber and the like. The thus supported bone conduction device is then incorporated in the housing 2.

Figure 9:
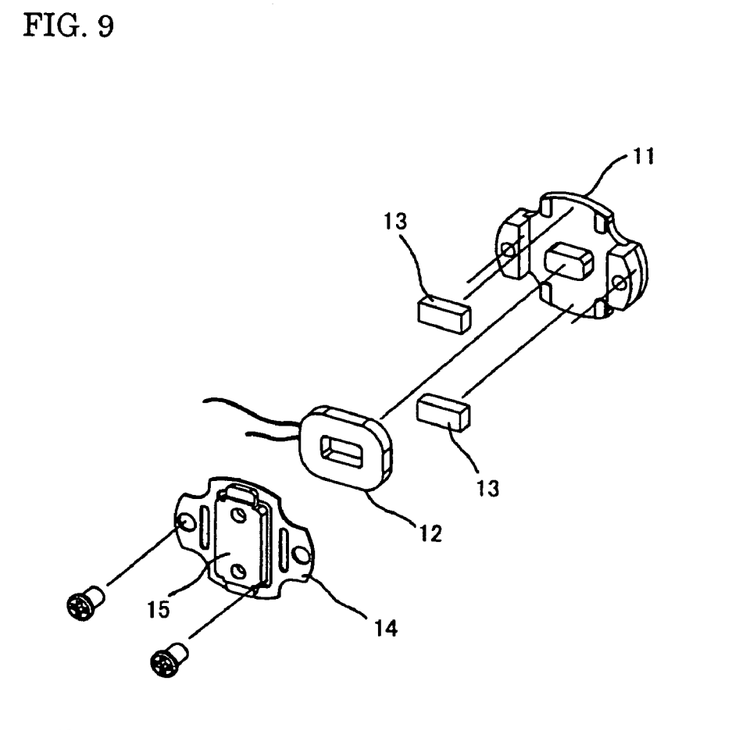
FIG. 9 is a view of the bone conduction speaker shown in FIG. 7, illustrating the bone conduction speaker in shape.

In the bone conduction speaker 1 shown therein, the diaphragm or vibration plate 14 is mounted on a yoke 11 through a small gap, wherein: the yoke carries both a voice coil 12 and a magnet 13; a central opening portion is formed in the vibration plate 14; and, a plate yoke 15 is fixedly mounted on the vibration plate 14 so as to be oppositely disposed from the thus formed central opening portion of the vibration plate 14. Consequently, as is clear from the above, the bone conduction speaker 1 is of a so-called "outer magnet type" (see FIG. 9). However, it is also possible for the bone conduction speaker 1 to be of a so-called "inner magnet type" in which a magnet is disposed inside the voice coil.

The device holder 6 is constructed of: a container portion 7, which covers and carries the bone conduction speaker 1; and, a fixing portion 8 provided with a threaded hole, wherein the fixing portion 8 extends outward from each of an upper and a lower portion of the container portion 7. Formed in a surface (in a front surface side in installation) of the container portion 7 is a laterally extending opening 9. The other surface of the container portion 7 is opened to form an opening therein. Formed in a peripheral portion of the thus formed opening is an annular engaging portion 10, which portion 10 is engaged with a yoke 11 of the bone conduction speaker 1. Preferably, a circular rib 17 is so formed as to extend along a peripheral edge portion of a rear surface of the abutting plate 16.

In the bone conduction speaker 1 in a condition in which the container portion 7 is mounted, a plate yoke 15 is exposed outward from the opening 9. Fixedly mounted on the plate yoke 15 is a leg portion of the abutting plate 16 assuming a circular disk-like shape, so that vibrations of the diaphragm or vibration plate 14 are outputted from the abutting plate 16.

When the circular rib 17 for receiving the abutting plate 16 is provided in the device holder 6, it is possible for the abutting plate 16 to control its motion by changing the circular rib 17 in width and/or in height (it is possible for the abutting plate 16 to intensify its effectiveness by increasing its width and height), which makes it possible for the bone conduction speaker 1 to control its output characteristics to a certain extent. Further, due to the presence of the circular rib 17, it is possible for the cell phone to prevent any dust from entering the interior of the device holder 6 through a gap formed between the device holder 6 and the abutting plate 16.

The device holder 6 carrying the bone conduction speaker 1 in a manner having been described in the above is mounted in the housing 2 by having a threaded sleeve 19 inserted into a threaded hole of a fixing portion 8 of the device holder 6, wherein the threaded sleeve 19 extends in a direction perpendicular to a peripheral edge portion of a device installation opening 18 of the housing 2, After that, a screw 21 is threadably engaged with the threaded sleeve 19 through a washer 20 so that device holder 6 is finally fixed to the housing 2. At this time, the abutting plate 16 slightly extends outward from the device installation opening 18.

In this construction, since the bone conduction speaker 1 is mounted in the housing 2 through the device holder 6 made of an elastic material, it is possible to keep the bone conduction speaker 1 in effective isolation with respect to the housing 2, which makes it substantially difficult for any vibration to be transmitted to the housing 2. Further, in the case of the bone conduction microphone, it is substantially difficult for the bone conduction microphone to pick up any noisy vibrations of the housing 2.

While the present invention has been particularly shown and described in detail with reference to the most preferable embodiments thereof, it will be understood by those skilled in the art that various changes in form and details may be made therein without departing from the spirit and scope of the present invention as defined by the appended claims. So, the present invention is note limited in scope only to its best mode for carrying out the invention.

The invention claimed is:

1. A portable telephone comprising:
   a bone conduction device having an outer surface edge;
   a housing having a concave portion with a bottom portion and an inner edge surface,
   said concave portion of said housing being larger in diameter than said bone conduction device when said bone conduction device is operatively positioned therein;
   a cushioning material operatively disposed between said inner edge surface of said concave portion of said housing and said outer surface edge of said bone conduction device such that said bone conductive device is supported in the concave portion of the housing only by the cushioning material disposed around the bone conduction device;
   a gap formed between said bone conduction device and said bottom portion of said concave portion of said housing such that no cushioning material is disposed in said gap, thereby reducing the thickness of the portable telephone; and
   a vibration surface of said bone conduction device positioned to be slightly extended outward from said housing by said cushioning material.

2. The portable telephone of claim 1, wherein the portable telephone is a foldable type provided with a housing constructed of two housing portions foldable relative to each other; and,
   a folded position of the telephone, wherein a vibration surface of said bone conduction device abuts an inner surface of one of said two housing portions.

3. The portable telephone of claim 1, wherein the portable telephone is a rotatable type provided with a housing constructed of two housing portions rotatable relative to each other; and
   a vibration surface of said bone conduction device that abuts an inner surface of one of said two housing portions when the two housing portions are rotated closed.

4. The portable telephone of claim 1, wherein the portable telephone is a slidable type provided with a housing having two housing portions that are slidable relative to each other when the telephone is in a closed position; and, when in the closed position of the telephone, a vibration surface of said bone conduction device abuts an inner surface of one of said housing portions, which is disposed oppositely from said other housing portions, wherein said other housing portions carries said bone conduction device of said housing.

5. The portable telephone of claim 1, wherein the portable telephone is a rotatable type provided with a housing constructed of two housing portions rotatable relative to each other in a closed position the telephone said vibration surface of said bone conduction device abuts one of said two housing portions;
   an inner surface of one of said two housing portions oppositely disposed from the other one of said two housing portions.

6. The portable telephone of claim 1, wherein the portable telephone is of a slidable type provided with a housing constructed of two housing portions slidable relative to each other; and
   a closed position of the telephone, wherein said vibration surface of said bone conduction device abuts an inner surface of one of said two housing portions.

7. A portable telephone comprising:
   a bone conduction device having a diameter and an outer surface edge;
   a housing having a surface and a through-hole portion having a diameter and a surface, said through-hole portion being operatively positioned in the housing, wherein said bone conduction device is operatively positioned in said through-hole portion;
   cushioning material operatively disposed between said surface of said through-hole portion and said outer surface edge of said bone conduction device such that said bone conductive device is supported in said through-hole portion of the housing only by the cushioning material disposed around the bone conduction device positioned within said through-hole portion, thereby reducing the thickness of the portable telephone; and,
   a vibration surface of said bone conduction device extending outward from said housing.

8. The portable telephone of claim 7, wherein an opposite side of said bone conduction device also serves as a vibration surface.

9. The portable telephone of claim 8, wherein the portable telephone is a rotatable type provided with a housing constructed of two housing portions rotatable relative to each other; and
   a closed position of the telephone, wherein said vibration surface of said bone conduction device abuts an inner surface of one of said two housing portions.

10. The portable telephone of claim 8, wherein the portable telephone is a slidable type provided with a housing constructed of two housing portions slidable relative to each other; and
  a closed position of the telephone, wherein said vibration surface of said bone conduction device abuts an inner surface of one of said two housing portions.

11. The portable telephone of claim 7, wherein the portable telephone is a rotatable type provided with a housing constructed of two housing portions rotatable relative to each other; and
  a closed position of the telephone, wherein said vibration surface of said bone conduction device abuts an inner surface of one of said two housing portions.

12. The portable telephone of claim 7, wherein the portable telephone is a slidable type provided with a housing constructed of two housing portions slidable relative to each other; and
  a closed position of the telephone, wherein said vibration surface of said bone conduction device abuts on an inner surface of one of said two housing portions.

13. A portable telephone comprising:
  a housing having a device installation opening;
  a bone conduction device;
  a device holder made of a resilient material wherein said device holder is constructed of a container portion and a fixing portion, wherein said container portion carries said bone conduction device therein such that said bone conductive device is supported in said container portion only by cushioning material disposed around the bone conduction device, thereby reducing the thickness of the portable telephone, and wherein said fixing portion is fixedly mounted on an inner surface of said device installation opening of said housing of the telephone and said bone conduction device extends from said housing; and
  a gap formed between said bone conduction device and said housing.

14. The portable telephone of claim 13, wherein an abutting plate is fixedly mounted on said bone conduction device to cover a front surface side of said container portion, wherein said plate is so arranged as to slightly extend outward from said housing.

15. The portable telephone of claim 14, wherein a circular rib for receiving therein a peripheral edge portion of a rear surface of said abutting plate is provided in a front surface side of said container portion.

* * * * *